United States Patent
Forster

(10) Patent No.: US 8,547,227 B2
(45) Date of Patent: Oct. 1, 2013

(54) RF COMMUNICATION DEVICE WITH ENERGY ENHANCEMENT

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 984 days.

(21) Appl. No.: 12/207,638

(22) Filed: Sep. 10, 2008

(65) Prior Publication Data

US 2010/0060456 A1  Mar. 11, 2010

(51) Int. Cl.
*G08B 13/14* (2006.01)
*G06G 1/14* (2006.01)
*G06F 19/00* (2011.01)

(52) U.S. Cl.
USPC .......... 340/568.1; 340/572.1; 340/572.7; 340/7.32; 705/22; 235/385

(58) Field of Classification Search
USPC ...................................................... 340/568.1
See application file for complete search history.

(56) References Cited

U.S. PATENT DOCUMENTS

| | | | | |
|---|---|---|---|---|
| 5,479,172 | A * | 12/1995 | Smith et al. | 342/51 |
| 6,462,647 | B1 | 10/2002 | Roz | |
| 6,480,699 | B1 * | 11/2002 | Lovoi | 455/41.2 |
| 6,700,491 | B2 | 3/2004 | Shafer | |
| 6,914,562 | B2 | 7/2005 | Forster | |
| 7,317,378 | B2 * | 1/2008 | Jarvis et al. | 340/10.1 |
| 7,400,253 | B2 * | 7/2008 | Cohen | 340/572.1 |
| 7,479,886 | B2 * | 1/2009 | Burr | 340/572.7 |
| 2003/0231106 | A1 | 12/2003 | Shafer | |
| 2004/0217865 | A1 | 11/2004 | Turner | |
| 2006/0281435 | A1 | 12/2006 | Shearer et al. | |
| 2007/0229271 | A1 | 10/2007 | Shionoiri et al. | |
| 2007/0229279 | A1 | 10/2007 | Yamazaki et al. | |
| 2007/0229281 | A1 * | 10/2007 | Shionoiri et al. | 340/572.7 |
| 2007/0279225 | A1 | 12/2007 | Pellerano et al. | |

FOREIGN PATENT DOCUMENTS

WO   2006/116168   11/2006

OTHER PUBLICATIONS

International Search Report dated Dec. 12, 2009 issued in corresponding International application No. PCT/US2009/054728.
Reply to the Written Opinion of the International Searching Authority dated Feb. 8, 2010 filed in corresponding International application No. PCT/US2009/054728.

* cited by examiner

*Primary Examiner* — Donnie L Crosland
(74) *Attorney, Agent, or Firm* — Avery Dennison Corporation

(57) ABSTRACT

A method of operating a radio frequency (RF) communication device includes internally storing energy received by the RF communication device, and using that energy to enhance communication by the RF communication device upon occurrence of a predetermined event. The energy received by the RF communication device may be energy transmitted by a shelf or other display unit that an object with the RF communication device is located on. The predetermined event may be any of a wide variety of events. The energy storage may be accomplished in a battery, capacitor, or other energy storage device. The use of energy to enhance communication may be used to provide increased power for sending, receiving, or detecting signals. The enhanced power may be provided continuously, and/or may include periods of power enhancement alternating with periods of non-enhancement.

18 Claims, 10 Drawing Sheets

RF COMMUNICATION DEVICE WITH ENERGY ENHANCEMENT

BACKGROUND OF THE INVENTION

1. Field of the Invention

The invention is in the field of radio frequency (RF) communication devices.

2. Description of the Related Art

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source for broadcasting signals, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory and the like. RFID tags and labels also can be characterized as to those to which information is written only once (although the information may be read repeatedly), and those to which information may be written to repeatedly during use. For example, RFID tags may store environmental data (that may be detected by an associated sensor), logistical histories, state data, etc.

RFID devices further can be characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited.

Active RFID devices have their own internal power source, which is used to power an integrated circuit or chip in the device, and broadcast a separate signal. Active RFID devices may be more reliable than passive RFID devices. There may be fewer errors in communication between active tags and readers. Active tags may also transmit at higher power levels than passive RFID devices. However, active RFID devices have the disadvantage of requiring a power source in order to communicate.

Semi-passive RFID devices also have a power source, but unlike active devices this power source is only used to provide that energy for internal operation of the device. In other words, semi-passive devices do not broadcast their own signals, as active RFID devices do. Semi-passive RFID devices usually communicate in a manner similar to that of passive RFID devices, by backscattering an incoming RF carrier signal. Thus semi-passive devices share with active RFID devices the disadvantage of requiring a power source, while ameliorating only some of the disadvantages of passive device communication.

Related to RFID devices are some types of electronic article surveillance (EAS) devices that also operate using RF signals and fields. Both RFID devices and EAS devices using RF fields may be referred to collectively as RF communication devices.

From the foregoing it will be appreciated that improvements in the area of RF communication devices would be desirable.

SUMMARY OF THE INVENTION

According to an aspect of the invention, an RF communication device includes an energy storage device that enables temporary operation enhancement using stored energy.

According to another aspect of the invention, an RF communication device has a capacitor internal or external to a chip of the device, for providing power for temporary operation in an enhanced power mode.

According to yet another aspect of the invention, an RF communication device has an enhanced power mode triggered by a predetermined event. The RF communication device has a rechargeable energy source that is used for providing additional power for operation of the enhanced power mode.

According to still another aspect of the invention, an RF communication device has two antennas, a first antenna for receiving and sending signals at a first frequency, and a second antenna for receiving energy at a second frequency, for charging an energy storage device of the communication device, for use in enhancing communication using the first antenna.

According to a further aspect of the invention, a method of using an RF communication device includes triggering an enhanced power mode of the RF communication device, powered by an energy storage device of the RF communication device, upon removal from a shelf or display of an object that the RF communication device is coupled to.

According to a still further aspect of the invention, a method of using an RF communication device includes triggering an enhanced power mode of the RF communication device, powered by an energy storage device of the RF communication device, upon occurrence of a condition in the environment of the RF communication device.

According to another aspect of the invention, a method of operating a radio frequency (RF) communication device includes the steps of: storing energy received by the RF communication device in an energy storage device of the RF communication device; and upon occurrence of a predetermined event, using the energy stored in the energy storage device to enhance communication by the RF communication device.

According to yet another aspect of the invention, a radio frequency (RF) communication device includes: an RF chip; a first antenna coupled to the RF chip for communicating information between the RF communication device and an external reader/detector device; an energy storage device coupled to the RF chip for providing power to the RF chip; and a second antenna coupled to the energy storage device, for providing power to the energy storage device.

According to still another aspect of the invention, a radio frequency (RF) communication device includes: an interposer that includes an RF chip and conductive leads electrically coupled to contacts on the RF chip; an antenna electrically coupled to the conductive leads; and a battery that includes an electrolyte layer and parts of the antenna and one of conductive leads on opposite respective sides of the electrolyte layer, wherein the parts of the antenna and the one of the conductive leads serve as electrodes for the battery.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

A method of operating a radio frequency (RF) communication device includes internally storing energy received by the RF communication device, and using that energy to enhance communication by the RF communication device upon occurrence of a predetermined event. The energy received by the RF communication device may be energy transmitted by a shelf or other display unit that an object with the RF communication device is located on. The predetermined event may be any of a wide variety of events, such as removal of the RF device from the shelf or other display unit, a signal sent to the RF communication device, or a change in environmental conditions, such as a change in temperature. The energy storage may be accomplished in a battery, capacitor, or other energy storage device. The use of energy to enhance communication may be used to provide increased power for sending, receiving, or detecting signals. The enhanced power may be provided continuously, and/or may include periods of power enhancement alternating with periods of non-enhancement. The energy received and stored by RF communication device may be a different frequency than that used in communicating with the RF communication device.

Figure 1:
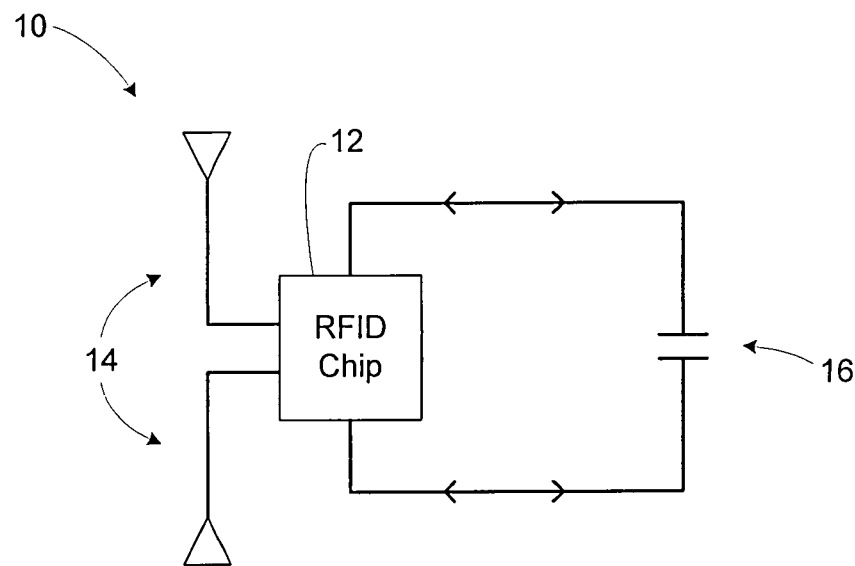
FIG. 1 is a schematic diagram of an RF communication device in accordance with an embodiment of the present invention.

FIG. 1 shows a radio frequency (RF) communication device 10 that has an RF communication chip 12, which may include an integrated circuit for controlling RF communication and other functions of the RF device 10. The RF communication chip 12 is coupled to an antenna 14 for communication with external devices, such as a reader or a detector of such devices. The antenna 14 may be any of a variety of antenna types, such as dipole antennas, loop antennas, slot antennas, or hybrids combining characteristics of these antenna types.

The RF communication chip 12 is also coupled to an energy storage device 16. The energy storage device 16 stores energy for later use to enhance operation of the RF device 10, after occurrence of a predetermined event that is used to trigger enhanced power operation. The energy storage device 16 may be any of a variety of types of devices. One broad category of energy storage devices is devices that store energy as differential electrostatic charge. An example of such devices is a capacitor. Another broad category of energy storage devices are devices that store energy as chemical potential, for example batteries.

The energy storage device 16 may be part of the same tag or label as the other components of the RF communication device 10. Alternatively the energy storage device 16 may be in a separate label or tag from the other components of the RF communication device, with the energy storage device 16 electrically coupled to those other components. The separate label or tag that includes the energy storage device 16 may be coupled to the same object as the RF communication device 10. Alternatively the separate label or tag may be coupled to the label or tag containing other components of the RF communication device.

As discussed in greater detail below, the predetermined event that triggers enhanced power operation may be any of a wide variety of events. Once enhanced power operation is triggered, power from the energy storage device 16 is used to provide increased power for sending, receiving, or detecting signals. The enhanced power may be provided continuously as long as the energy storage device 16 is able to provide power. Alternatively, the energy storage device 16 may provide pulsed power enhancement, with periods of power enhancement alternating with periods of no enhancement. This may serve to provide power enhancement for a longer period of time than would be possible with continuous power enhancement, while still provide an acceptable level of readability or detectability of the RF communication device 10. As another alternative the energy storage device 16 may initially provide continuous power enhancement upon occurrence of the predetermined event, and may subsequently shift to pulsed power enhancement when the amount of energy remaining in the energy storage device falls below a certain level, for instance below 10% of the energy storage capacity of the energy storage device 16.

The enhancement of operation upon occurrence of the predetermined event allows a temporary boost in capability of the RF device 10 at a time when increased detectability or readability is important. By controlling when the energy boost occurs the RF communication device 10 may have increased functionality for a given purpose, such as in electronic article surveillance (EAS) or as a warning device. This EAS capability may be in addition to the RF communication device's ability to function as a radio frequency identification (RFID) device for example by sending identification or other information to a remote reader.

Figure 2:
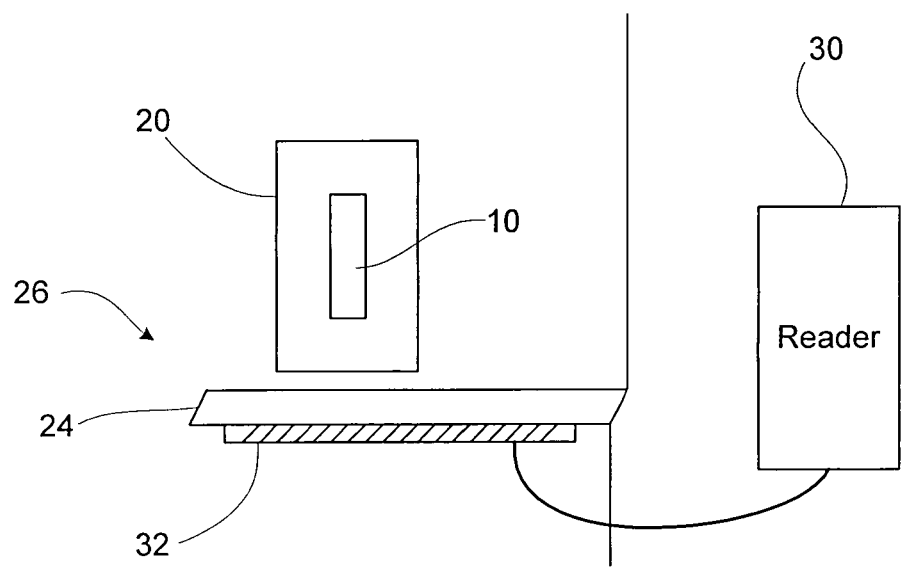
FIG. 2 is a diagram of a display unit holding an object having the RF communication device of FIG. 1 attached to it.

FIG. 2 shows one use of the RF communication device 10, with the device 10 used as an EAS device. The RF communication device 10 is mounted on an object 20 that is on a shelf 24 of a display unit 26, such as may be used for displaying a product for sale. Display units may come in any of a variety of configurations, for example including shelves for placing objects on, or hooks or other devices for hanging products from.

The display 26 has a reader 30 that is coupled to a shelf antenna 32 in the shelf 24. The antenna 32 allows communication between the reader 30 and the RF device 10. Through this link information may be gathered on the objects on the display 26, for inventory and other purposes. It will be appreciated that while the object 20 is within the display 26, the RF device 10 remains close to the antenna 32. This makes for straightforward communication between the RF device 10 and the reader 30. No power enhancement in the RF communication device 10 is necessary for such communication. In addition, energy from the antenna 32 that is received by the RF device 10 may be used to power up, recharge, or maintain energy stored in the energy storage device 16 (FIG. 1) of the RF communication device 10.

The system shown in FIG. 2 may be configured to trigger the enhanced power operation of the RF communication device 10 when the object 20 is moved away from the display unit 26. This trigger may be fully internal to the RF communication device 10, for instance with enhanced power operation occurring when the RF communication device 10 no longer detects a signal from the antenna 32. As another alternative, the reader 30 and the antenna 32 may be configured to send a specific signal to the RF communication device 10 when movement of the RF communication device 10 away from the display unit 26 is detected.

When the enhanced power mode of the RF communication device 10 is triggered, the RF communication device 10 becomes better able to communicate with other devices, such as readers and detectors. This allows communication at a longer range, and/or with more reliability, relative to communication without the power enhancement provided by the energy storage device 16. This enhanced detectability may be utilized for electronic article surveillance, for example to prevent theft of the object 20.

Figure 3:
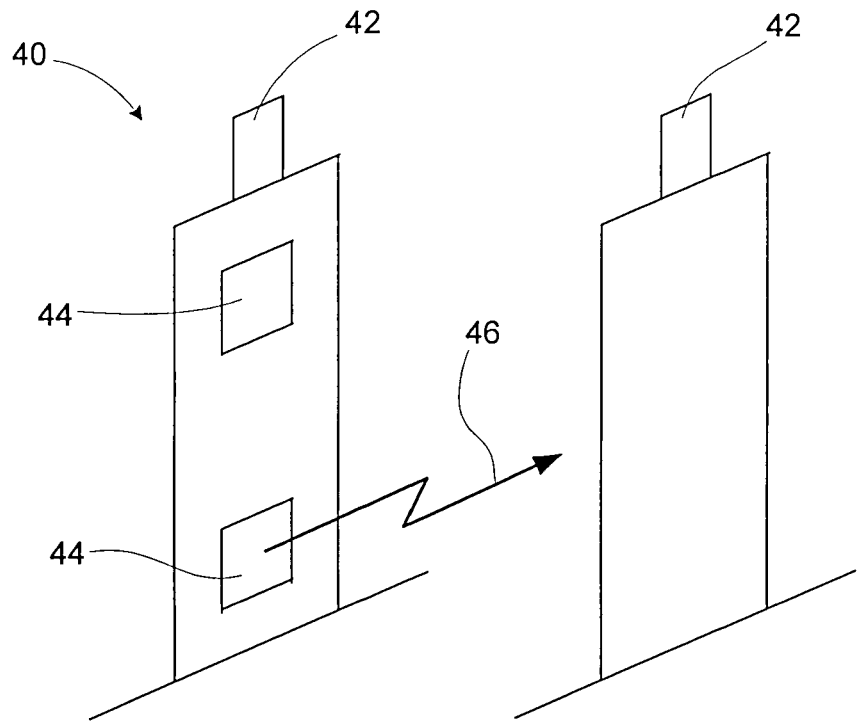
FIG. 3 is a view of a gate structure for detecting EAS devices.

FIG. 3 shows an EAS gate structure 40 that may be used to detect theft of the object 20. The gate structure 40 may be placed at an exit to a store, and may be configured to detect certain RF devices passing through. When an RF device that has not been deactivated passes through, visible and/or audible alarms 42 may be set off, alerting store personnel of a possible theft attempt. The gate structure 40 includes one or more UHF antennas 44 that set up a UHF interrogation field 46 between parts of the gate 40. The RF communication device 10 may be configured, when placed on the object 20, to interact with the UHF interrogation field 46 so as to trigger the alarm(s) 42 on the gate structure 40. This configuration may be changed during a checkout process when payment for the object 20 is collected. The change in configuration may involve sending a signal or otherwise disabling the RF communication device 10 or otherwise preventing the RF communication device 10 from communicating with the gate structure 40 in such a way that would trigger the alarm(s) 42. For example a EAS bit or flag in the device 10 may be set to indicate that the alarm 42 should not be triggered by the RF communication device 10.

By enhancing power of the RF communication device 10 its usefulness as an EAS device is improved. The energy storage device 16 provides a boost in power for a limited amount of time. It will be appreciated that only a limited-time power boost would normally be necessary for an EAS device. The critical time for possible theft of the object 20 is in the minutes after the object 20 is removed from the display unit 26. Enhancement of the communication ability of the RF communication device 10 during this critical period significantly enhances the usefulness of the RF communication device 10 as an EAS device.

The amount of time that the energy storage device 16 enhances power of the RF communication device 10 may vary widely, depending for instance upon the power requirements of the RF communication device 10, the power capacity of the energy storage device 16, and the type of power enhancement provided (pulsed versus continuous). It may be sufficient for an EAS purpose to have the enhanced power mode operable for 30 minutes or some lesser time period.

The gate structure 40 may also emit a field at a lower frequency, such as about 8.1 MHz. The gate structure 40 may be configured to emit such a frequency to detect varieties of EAS devices that interact with a field at such a frequency. Such a field may be used to detect the presence of EAS devices by detecting a dip in drive coil voltage caused by the present of a resonant device (resonant at the given frequency) in the field. Such a field may also be used to detect RF communication devices, such as the RF communication device 10, as described further below.

Figure 4:
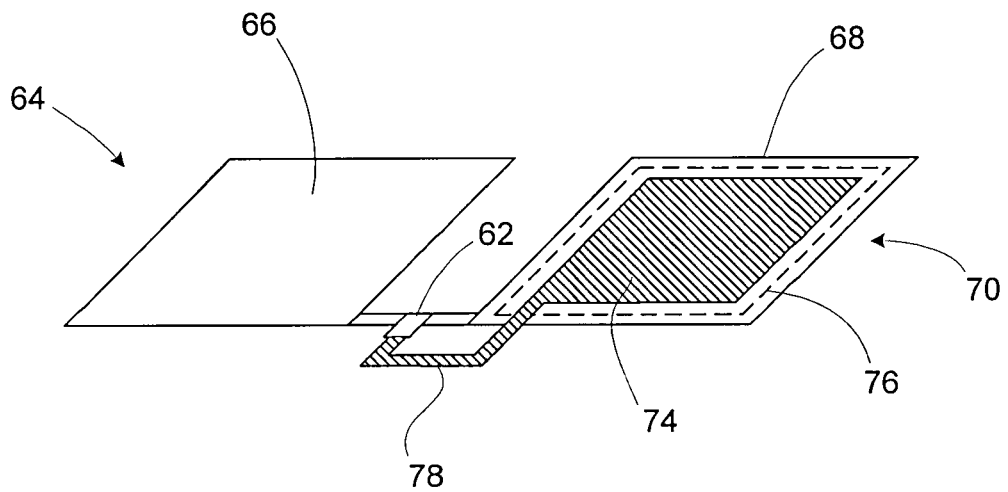
FIG. 4 is a diagram of an embodiment of an RF communication device in accordance with an embodiment of the present invention.

FIG. 4 shows a layout for one embodiment of the RF communication device 10. The device 10 has an RF communication chip 62 that is coupled to a dipole antenna 64 that has a pair of plates 66 and 68. The plate 68 also forms one plate of a capacitor 70. The capacitor 70 also includes a second conductor plate 74 parallel to and offset from the antenna plate 68, and a dielectric layer 76 between the plates 68 and 74. A conductive connection 78 connects the capacitor conductor plate 74 and a suitable contact on the chip 62. This allows stored energy to be provided to the chip 62, allowing the device 10 to operate in an enhanced power mode.

An alternative arrangement for the device 10 is to have the plates 68 and 74 made out of etched aluminum, with thin layers of oxide thereupon. A liquid or gel electrolyte may be provided between them, in the layer 76.

FIGS. 5-10 show diagrams illustrating internal workings of parts of various embodiments of the RF communication device 10. Certain common features of many of the various embodiments are not described below with regard to each embodiment.

Figure 5:
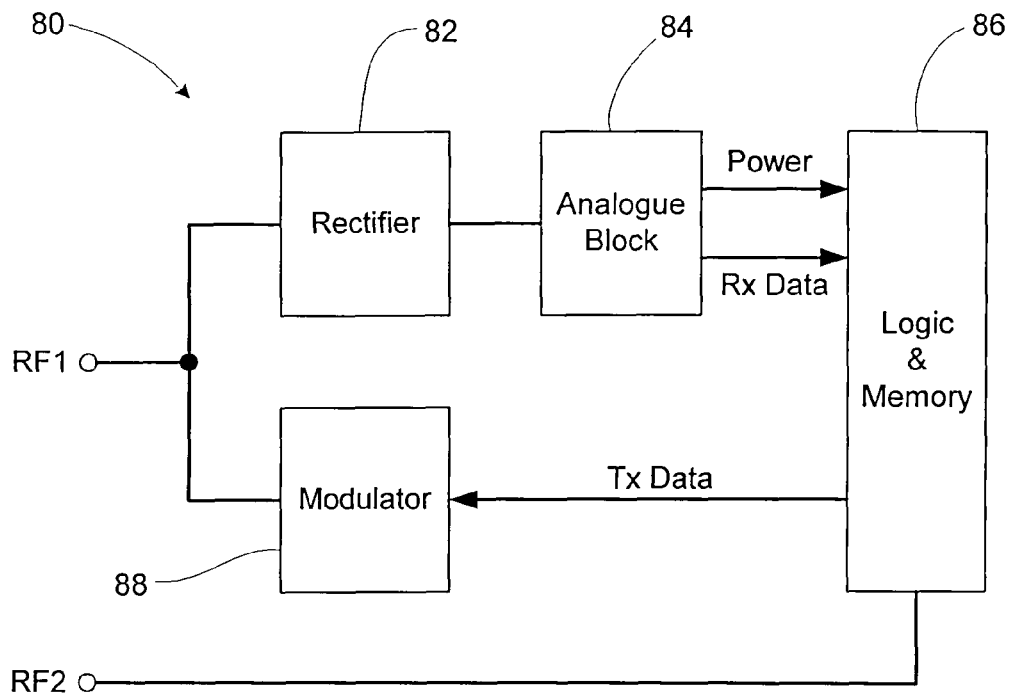
FIG. 5 is a block diagram of parts of an RF chip.

FIG. 5 shows a basic block diagram of an RF chip 80 without power enhancement (a passive RF device). A pair of ports or contacts RF1 and RF2 are used to communicate with external devices, to send and receive signals. A rectifier 82 and an analog block 84 process incoming signals, and provide power and received data signals (RX data) to logic and memory 86 of the chip 80. Data signals sent by the logic and memory 86 (TX data) passes through a modulator 88 and leaves the chip 80 through the RF1 contact. It will be appreciated that the ports or contacts RF1 and RF2 are coupled to a suitable antenna for sending and/or receiving signals from an external device.

Figure 6:
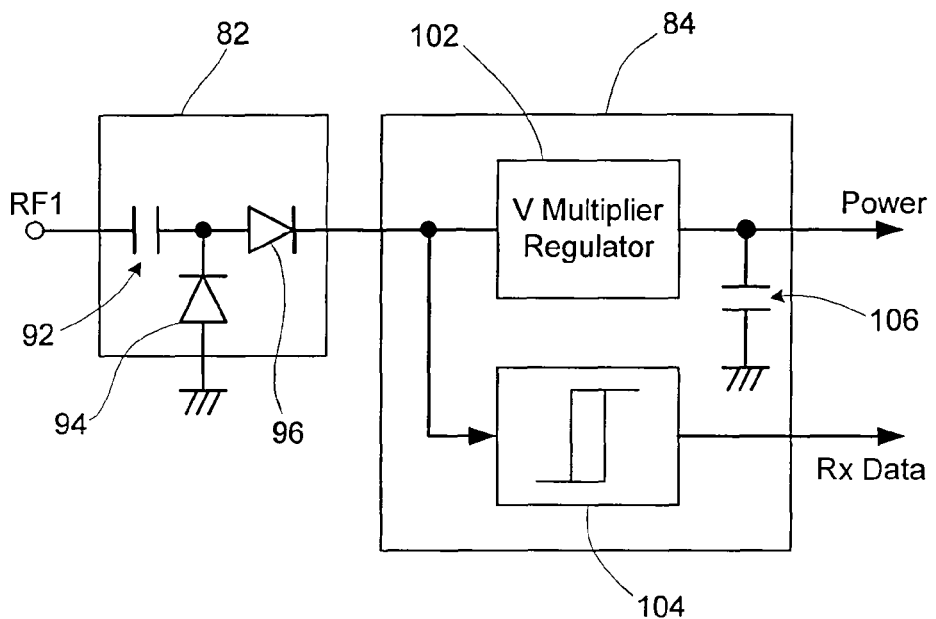
FIG. 6 is a diagram showing more detail of some of the parts of the RF chip of FIG. 5.

FIG. 6 shows more detail regarding the rectifier 82 and the analog block 84. The rectifier 82 includes a capacitor 92 and a pair of diodes 94 and 96. The analog block 84 includes a voltage multiplier/regulator 102 and a demodulator 104. The analog block 84 also includes a small capacitor 106 that enables the chip 80 to modulate the incoming signal without losing power.

Figure 7:
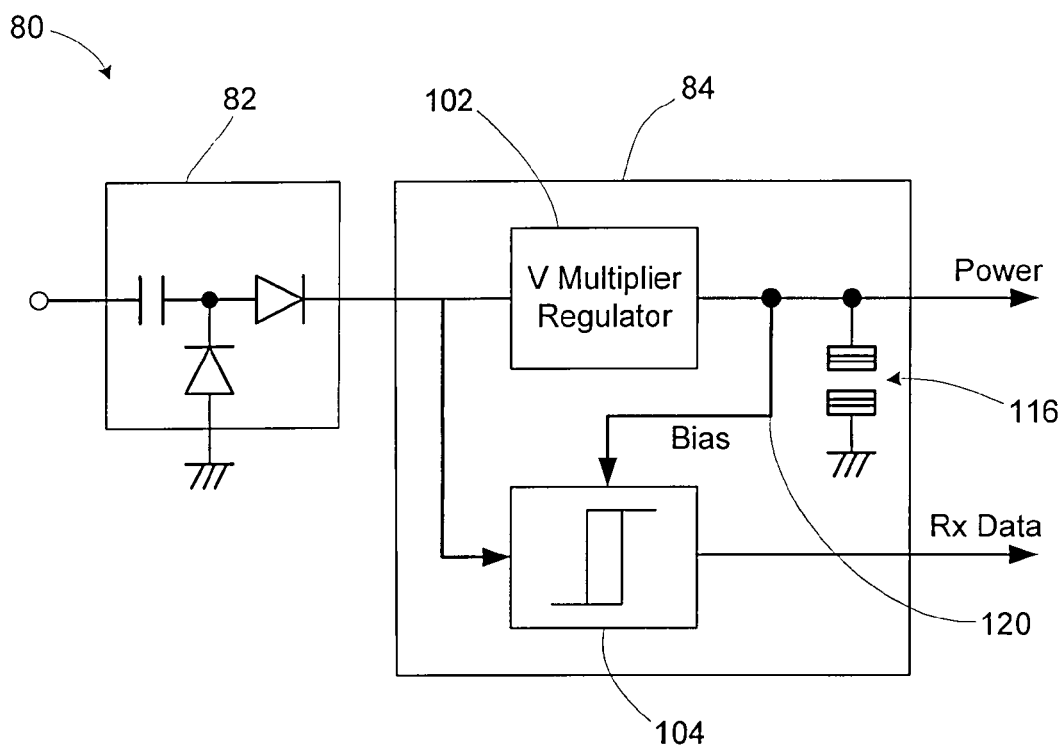
FIG. 7 is a diagram showing RF chip parts of another embodiment of the present invention.

FIG. 7 shows an enhanced version of the chip 80 in which the small capacitor 106 has been replaced by a larger capacitor 116 that has been integrated into the chip 80 to provide enhanced power to the chip 80 for a limited time. The larger capacitor 116 allows the chip 80 to operate as a semi-passive device for the limited time, for example for about 20 minutes. A bias line 120 provides power from the capacitor 116 to the demodulator 104, as well as providing power for a logic block so that the RFID device is capable of responding to an incoming command. It is desirable that the logic block remains in a standby or quiescent state until a signal is detected by the demodulator 104, in order to reduce the power consumption.

The larger capacitor 116 contrasts with smaller capacitors used in prior RFID devices. In normal passive communications a capacitor is required to store energy for operation of the device during the period it is replying to a reader system. The value of capacitor required will vary depending on the exact design of the chip and the communication message length and data rate. For example, for a passive RFID chip that would require 1 μA of current at a minimum voltage of 1 volt, and for a transmission event that would last 5 milliseconds, and if the capacitor was charged to 2 volts before the transmission, a capacitor value of 5 nF would be needed. In a semi passive mode where the capacitor is providing bias for a detector of incoming commands or events to trigger an enhanced response for a period of 20 minutes, the logic section of the RFID chip can be static, as it is not required to generate a transmission data sequence, and hence power consumption can be reduced, to say 100 nA. On this basis, again assuming a minimum voltage of 1 volt and the storage capacitor being pre-charged to 2 volts, a capacitor value of 120 μF would be needed. This is very much larger than that required for simply regulating the energy supply to the chip during a transmission event in a passive RFID device.

The required storage capacitor value from the above example can be reduced by pulsing the enhancement effect on a duty cycle. For example, a 10:1 duty cycle will drop the average energy consumption to 10 nA and hence a 12 μF capacitor could be used. The large capacitor 116 is not required for normal passive communications. Therefore there would not be a reason for implementing it in a passive device, as including it either internally or externally to the RFID chip would incur additional cost.

The charged capacitor also allows the chip to record or store events prior to being read, such as inputs from sensors, and information or data regarding time. The sensor capability could record information such as location from position beacons. Or the devices could be activated by shelf readers, allowing the devices to store identifications, and hence positions. This information could be used in the event of an EAS activation, to give information of how a stolen product moved through the store. Secondly, even for devices that are de-activated normally at the checkout, the device could contain a valuable record of how the customer shopped and what products they bought, and how they moved through the retail space. This may be of use in monitoring retails sales and product placement.

Other alternatives are possible. In one embodiment the device communicates in a fully passive mode prior to the occurrence of the triggering event, and only then operates in a semi-passive mode. For example an RF communication device on a shelf or other retail display would be maintained in passive mode by proximity to the reader system. The decision to use enhanced mode can be by command or by the signal from a passive reader falling below a threshold, or both, where to activate the tag or other device has to be receiving a specific command and then have the signal strength drop. This feature stops the mode getting activated when it is not needed. For example if the tags were in a box in a goods-receiving portal, we would not want them going enhanced when they were moved out of the portal. Other triggering events could be a sensor, for example a simple piezoelectric element integrated into the tag structure could detect movement, or the reduction of pressure between the product and a shelf.

It should be appreciated that it is not obvious from prior devices that the capability to have an enhanced performance for a short period can be useful. This is only possible due to management of deployment of the energy for the objectives. Typically semi-passive tags are designed to have years of lifetime, not minutes. The management of energy described herein is a combination of sensed event and commanded behavior. It can be very simple, such as "after ARM, IF Shelf Signal<X THEN Response EAS Detect=Enhanced." Or it can be more complex, for example modes where the tag manages its energy supply by reducing its duty cycle. (For instance for the first half of the stored energy the duty cycle is 1. Then it may drop to 0.5 until only a quarter of the original stored energy or stored energy capacity is left. Then it drops to 0.25 duty cycle until the stored energy is 0.125. This process of reducing the duty cycle of energy output can continue ad infinitum.) This scheme trades extended capability against reduced access speed, as a reader may have to wait until a period of enhancement occurs in order to detect a device and/or communicate with the device.

Figure 8A:
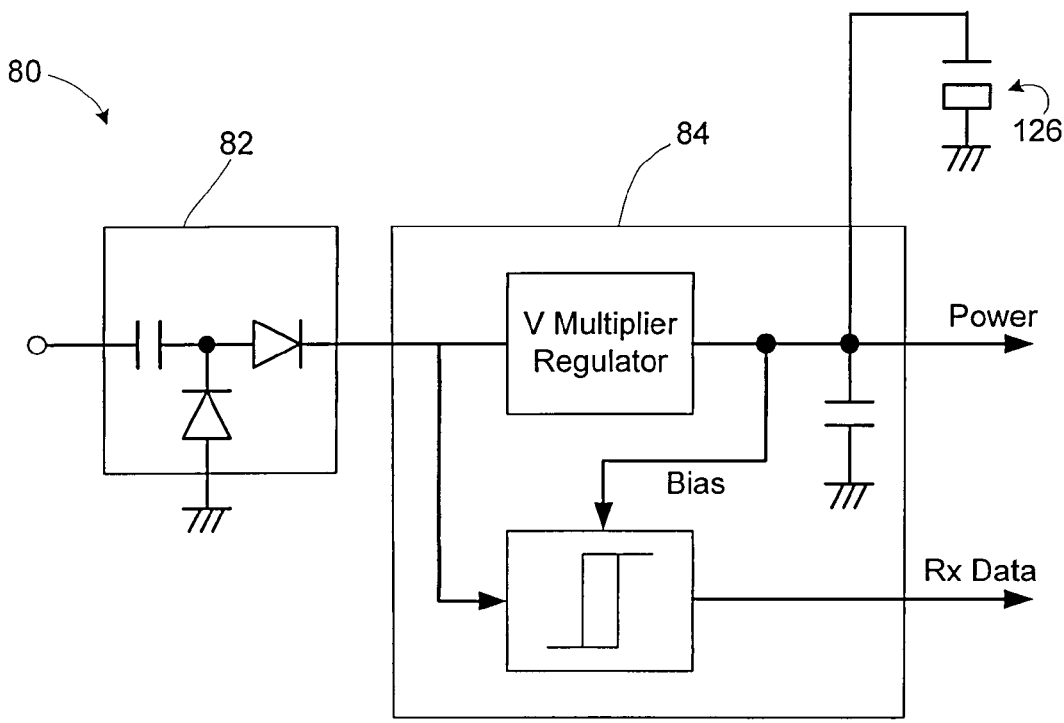
FIG. 8A is a diagram showing RF communication device parts of yet another embodiment of the present invention.

FIG. 8A shows a variant in which the capacitor for providing enhanced power is an external capacitor 126 that is external to the analog block 84. The external capacitor 126 is used in addition to the small capacitor 106 that is part of the analog block 84. The external capacitor 126 may be a part of an interposer or strap that the chip 80 is mounted on. Such interposers or straps may be used to facilitate making electrical contact between an RF chip and antennas or other components of an RF communication device. Further information of interposers or straps may be found in co-owned U.S. Patent Publication No. US 2006/0063323 A1, the description and drawings of which are hereby incorporated by reference.

The capacitors 116 and 126 may be electrically connected in parallel. In such a configuration the capacitors 116 and 126 provide a total capacitance for storing energy, which can be used by the chip when it is placed into enhanced mode. The enhanced mode may be triggered by removal from the energy supply, by receipt of a command, by a separate event, such as sensing a signal at a different frequency (such as the 58 kHz or 8 MHz emission from an EAS gate) or by some other sensed event, such as a change of resistance.

Figure 8B:
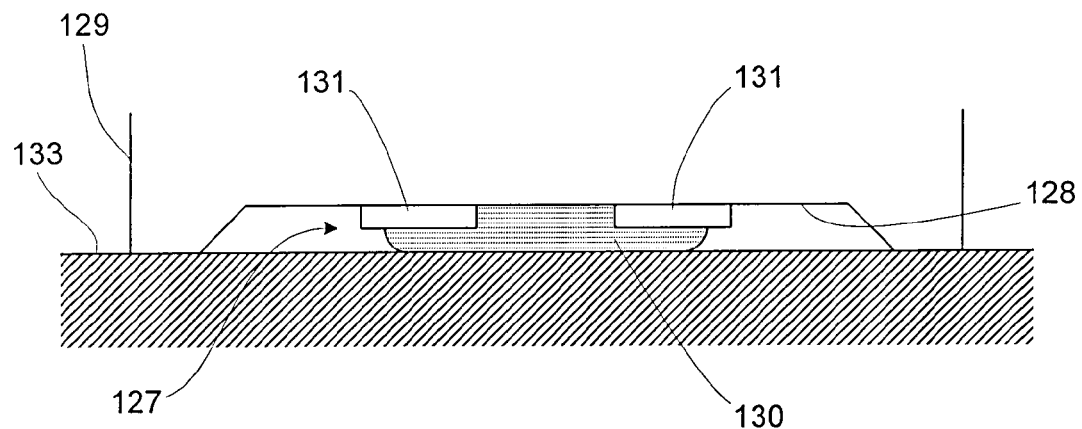
FIG. 8B is a side view of an object having an RF communication device in accordance with the present invention, with the object on the shelf or other surface.
Figure 8C:
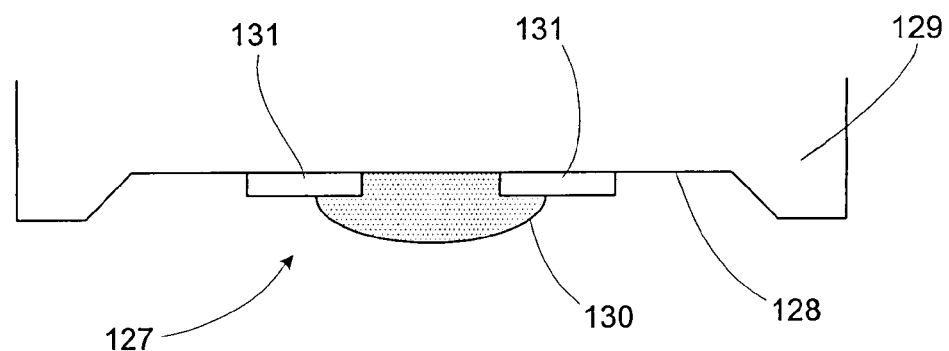
FIG. 8C is a side view of the object of FIG. 8B, with the object off of the shelf or other surface.

For example, with reference to FIGS. 8B and 8C, a tag or other RF communication device 127 maybe placed on the bottom 128 of a product or other object 129, and may incorporate a globule or layer 130 of a carbon-loaded flexible polymer over two tracks or pads of conductive material 131.

The flexible polymer 130 may be compressed when the product 129 is on a shelf or other surface 133 (FIG. 8B). In this condition the flexible polymer 130 hence gives a reduced resistance, but when the object 129 is picked up (FIG. 8C) the resistance increases. This increase in resistance can trigger an enhanced mode of operation.

Figure 8D:
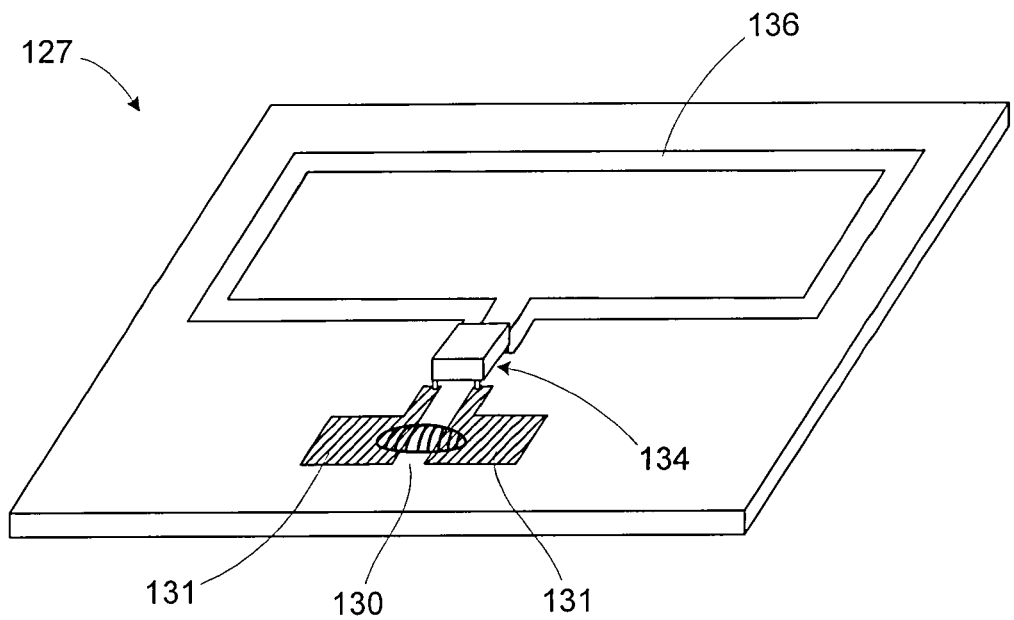
FIG. 8D is an oblique view of one configuration of an RF device for use with the object of FIGS. 8B and 8C.

FIG. 8D shows one configuration of the RF communication device 127 that includes the carbon-loaded flexible polymer globule or layer 130. The flexible polymer 130 is in contact with the conductive pads 131, which in turn are coupled to ports or contacts of an RFID chip 134. Other ports or contacts of the RFID chip 134 are coupled to an antenna 136.

Figure 8E:
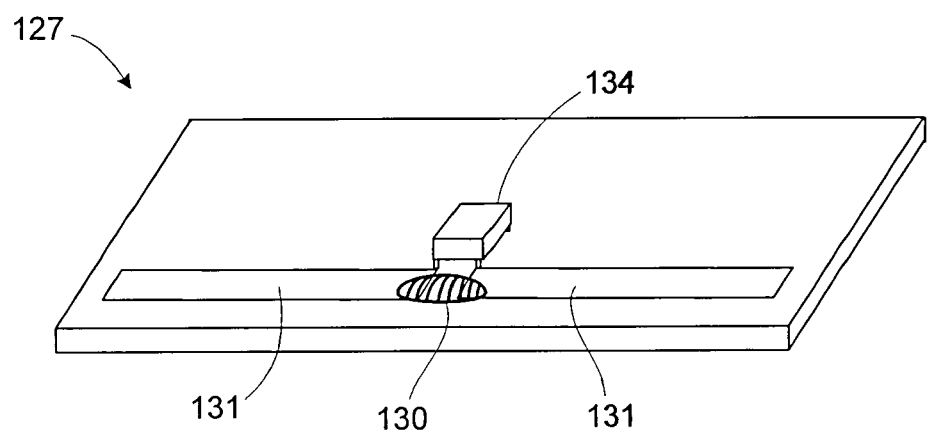
FIG. 8E is an oblique view of another configuration of an RF device for use with the object of FIGS. 8B and 8C.

FIG. 8E shows an alternate arrangement of the RF communication device 127, in which the conductive pads 131 are coupled to the RFID chip 134, and serve a dual function. The pads 131 are coupled to the flexible polymer 130 for use as a pressure trigger for the RF communication device 127. The pads 131 also function as antenna elements (a dipole arrangement is illustrated) for communications between the RF communication device 127 and external readers/detectors.

The flexible polymer 130 may have a thickness from 0.1 to 3 mm, for example. Optionally the sensing material (corresponding to the flexible polymer 130 in the illustrated embodiments) may change an alternate parameter when the tag is in proximity to the shelf, for example changing capacitance between the conductive pads.

In an alternate configuration the capacitors 116 and 126 connected to different outputs of the voltage regulator block. The capacitor 116 would be preferentially charged first, and the capacitor 126 would be only charged when the capacitor 116 is full. Then the power from 116 and 126 can be selectively taken by the regulator block to feed the digital and analogue circuits as required. The reason for charging the capacitor 116 first is to allow the chip to operate normally as a passive RFID device. If the incoming signal from a reader system had to charge the large total capacitance, it would take longer and slow down the ability of the device to respond passively.

Figure 9A:
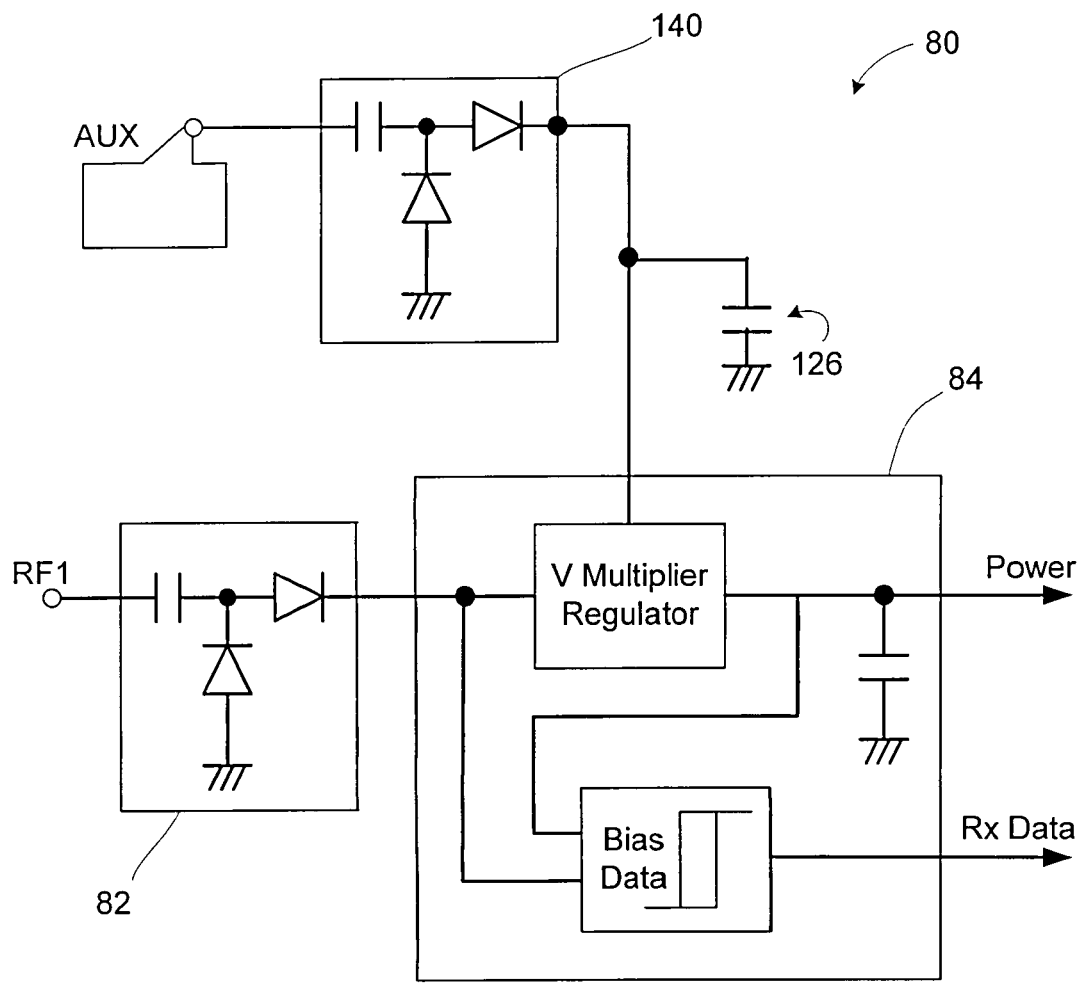
FIG. 9A is a diagram showing RF communication device parts of still another embodiment of the present invention.

FIG. 9A shows another variant configuration in which the external capacitor 126 is powered by a separate rectifier 140. The rectifier 140 may receive input from a separate antenna 142 (shown schematically) coupled to an auxiliary input AUX of the chip 80. The antenna 142 may be configured to operate (preferentially receive energy) at a different frequency from that of the antenna 14 (FIG. 1) used for communication. For example, the antenna 142 may be configured for receiving power at a relatively low frequency, such as 13.56 MHz or approximately 8.1 MHz or 58 kHz. A frequency of 8.1 MHz is associated with one form of EAS system, a system which detects a dip in a drive coil voltage cause by the presence of a resonant device in the field. Using the configuration shown in FIG. 9 the RF device 10 can trigger an EAS in two different ways. The first way is by the absorption of energy at the frequency of the field set up by the EAS system (such as the gate structure 40 shown in FIG. 3). The second way is by using the power from the EAS system to boost performance of the RF communication through the communication antenna 14 such that the communication is detectable by the UHF antennas 44 (FIG. 3) of the gate structure 40. The RF communication device may also set off the alarm of the gate structure by rectifying some of the energy from a low-frequency EAS field emitted by the gate structure, thereby being detectable by emulating the presence of a tuned EAS device.

In addition, the stored energy from the UHF signal can be used by the RFID chip to allow it to generate a burst of 58 kHz signal in response to an incoming signal related to the re-emission of an enhanced UHF response. For example, the RFID inlay (or device) may respond with a data signal which has a sequence of digital bits at the start of its response, frequently called a pre-amble or pilot tone, which emulates a 58 kHz signal re-emitted by an acousto-magnetic RFID device in response to an incoming 58 kHz field. In addition to the UHF response, the current used to drive the modulation transistor is passed through a coil or other structure so it also emits a low frequency magnetic signal. By ensuring that the response back from the RFID tag is commanded to occur correlated to the burst emission from the acousto-magnetic gate system, the re-radiated magnetic signal can trigger a theft alarm.

Figure 9B:
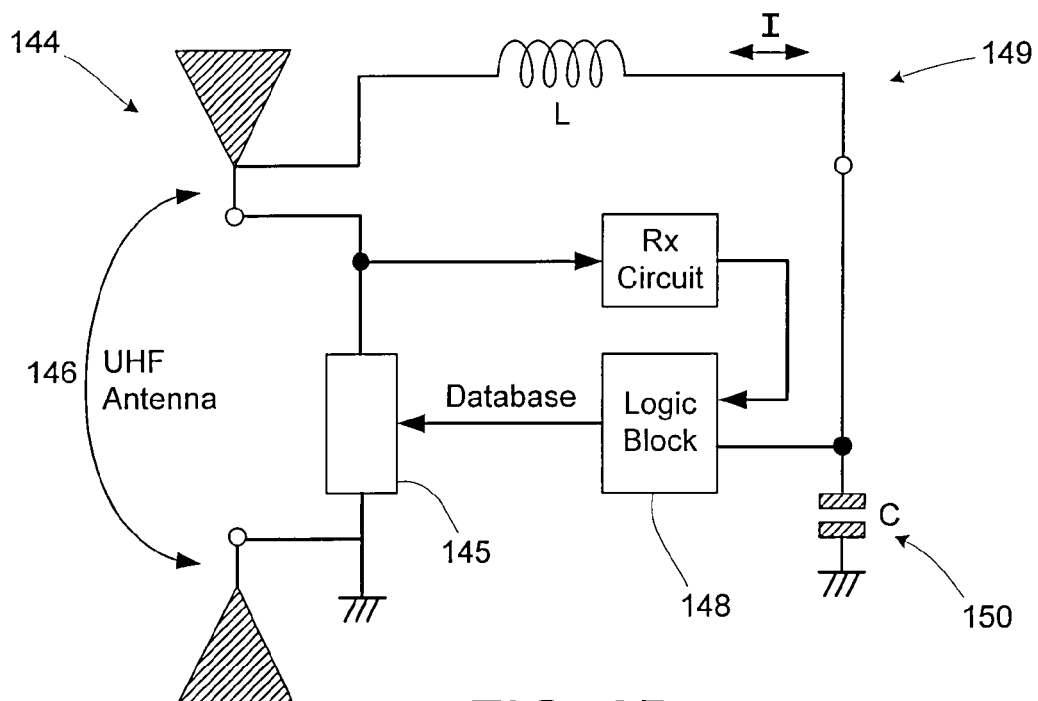
FIG. 9B is a block diagram of an RF communication device of another embodiment of the present invention.
Figure 9C:
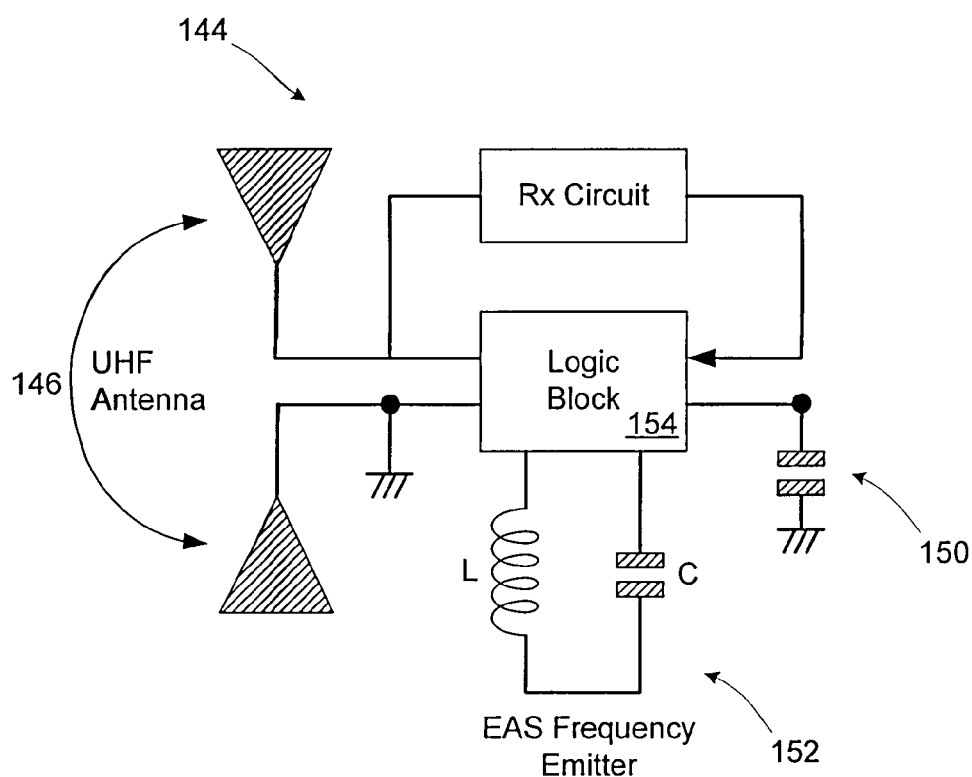
FIG. 9C is a block diagram of an RF communication device of yet embodiment of the present invention.
Figure 9D:
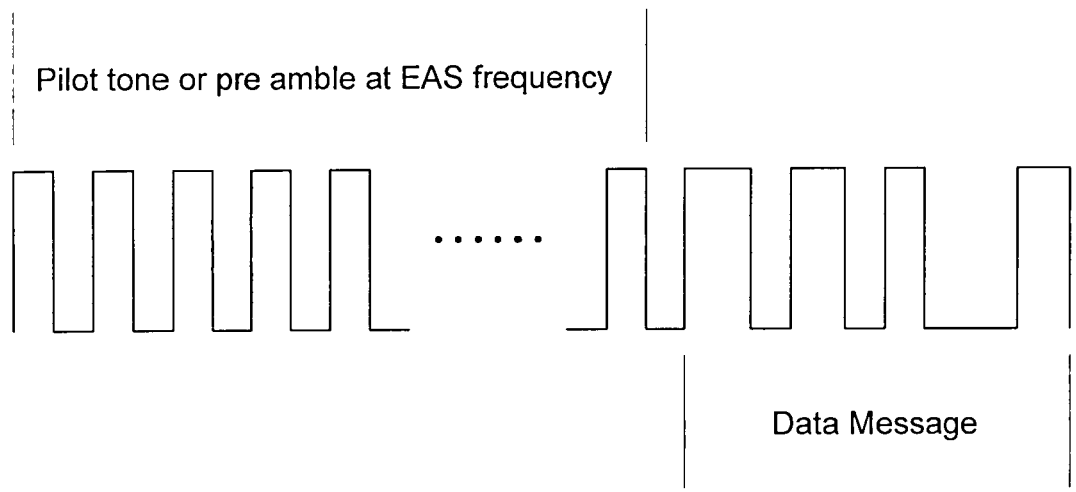
FIG. 9D is a diagram showing a signal from an RF communication device such as that of FIG. 9B or FIG. 9C.

Such a device may be implemented in various ways—two examples are shown in FIGS. 9B and 9C. These devices share the characteristic of using the energy to emit a signal simultaneously at two frequencies, one of which is optimized to interact with existing EAS infrastructure, for example being emitted at 58 kHz. The energy for this extra transmission comes from the energy storage, which may be any of the types described, but will be under the control of the logic block. In an RF communication device 144 (FIG. 9B) a modulation transistor 145, which is used to alter the impedance presented at UHF to an antenna 146, and which is coupled to a logic block 148, is also used to control the current flow through a coil structure 149. This coil structure 149 may use the energy storage capacitor 150 to resonate at the desired frequency or may use a separate capacitor. In this device, as shown in FIG. 9D, the pilot tone/pre-amble of the data message sent back to the UHF reader is set at the same frequency as the EAS system frequency, and timed so that the associated magnetic emission would be recognized by the existing system as an EAS alarm.

In an alternative configuration of the device 144 (FIG. 9C), a coil 152 is driven by a separate output or pair of outputs from a logic block 154, allowing more flexibility of what signal can be sent when the device 144 is in enhanced mode.

Figure 10:
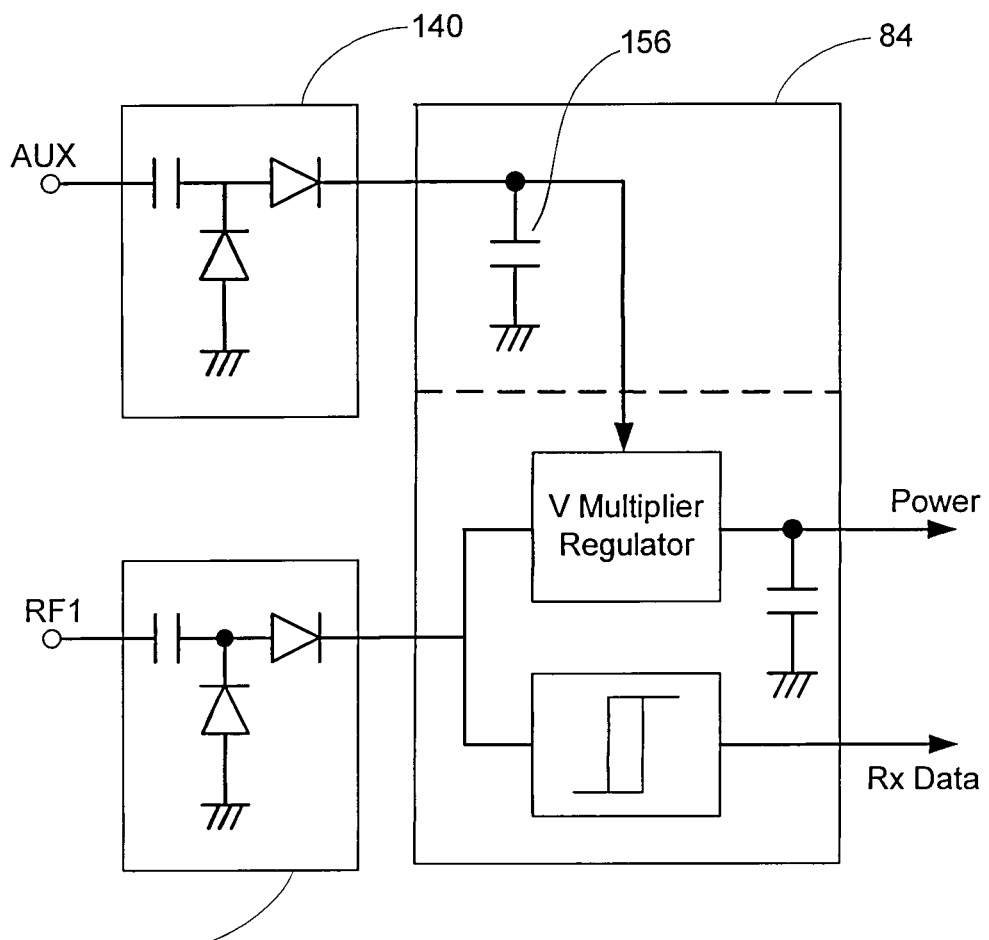
FIG. 10 is a diagram showing RF communication device parts of a further embodiment of the present invention.

FIG. 10 shows another embodiment, one in which the analog block 84 includes a large capacitor 156 that is charged by its own rectifier 140, separate from the rectifier 82 that is coupled to the RF 1 input. The rectifier 140 is coupled to an AUX input or contact of the RF chip 80.

The embodiments described above all utilize capacitors as their energy storage devices. It will be appreciated that batteries are an alternative to the capacitors. However batteries are relatively expensive and frequently contain hazardous materials. Batteries have a tendency to self discharge. Also, for low cost chemistries, batteries do not work well at low temperatures, such as the temperatures commonly used for chilled or frozen foods. For these reasons capacitors may have advantages over batteries.

As described above, the capacitor for energy storage may be incorporated as part of the antenna for RF communication. The surface of the conductive plates of the capacitor, such as aluminum plates, may be etched in order to increase its effective surface area. Oxide on the surface of the plates provides a thin dielectric insulator. A gel or liquid electrolyte between the oxide layers makes for a very high value capacitor in a small volume. Such double-layer capacitors are often known as supercapacitors.

The enhanced power mode may be a pulsed power enhancement. Pulsing the power enhancement allows for longer operation of the power enhancement, and/or for use of more energy in enhancing operation during the powered pulses. In accordance with pulsed operation, the current used to allow the RF communication device to respond to a UHF reader (to determine the status of an internal EAS bit of flag)

is switched on and off for suitable periods within a duty cycle. For example the enhanced power may be provided for 10 microseconds for every 100 milliseconds. This may provide sufficient time for the RF communication device to be interrogated by the UHF reader. Such pulsing of power enhancement reduces the energy of enhancement by a factor of 10,000, relative to continuous power enhancement. It will be appreciated that the time segments given above for the cycle of power pulsing are only examples, and that other suitable time periods may be used instead. For example, the pulsing may be such that the enhanced power is provided for 1% or less of the duty cycle.

Such pulsed enhancement may be applied from the commencement of enhancement. Alternatively, the enhancement may initially be continuous, with pulsing of the power enhancement only applied after the energy level in the energy storage device 16 (FIG. 1) reaches a certain threshold, for example 10% of the energy storage device's energy capacity.

The power enhancement may be variable in other ways, with different levels of power enhancement provided in different circumstances. The RF communication device may be configured to provide different levels of power enhancement upon receiving different input signals or upon detecting different environmental conditions, for example. For example, the enhancement may have different levels associated with different power consumptions, such as high medium and low. The required level of enhancement may be recorded into the RFID device by writing a value in a non volatile memory location, or may form part of an algorithm which is designed to maximize the probability of the enhanced tag being detected, where the mode is a function of how much power is available, the repetition rate and any sensed parameter. The set enhancement may vary as part of a power management strategy; for example, at a given duty cycle and pulse rate of enhanced performance, the tag may have 4 periods of low power, followed by 1 or 2 periods of high power, or a random sequence of mode selection (periods of high and low power) may be used to get the same average levels. It will be appreciated that these are only a few of the great variety of possibilities.

Possible predetermined events for triggering the enhanced power mode are many and varied. The enhanced power mode may be triggered by the receipt of a certain signal by the RF communication device. A signal having certain data or at a certain frequency (or within a range of frequencies) may be used a trigger. For example the RF communication device may be placed on a display unit such as the display unit 26 (FIG. 2), in which the device ordinarily receives a signal at a first frequency. A trigger may be receiving a signal at a second frequency. This may be done for example for purposes of enhancing communication of the RF communication devices for a short time, such as to take an inventory of nearby RF communication devices (and the objects that the devices are attached to). As another alternative, receipt of energy at a given frequency from the gate structure 40 may itself serve as a trigger for enhanced power operation that uses energy from the energy storage device.

Alternatively the absence of a given signal may be used as a trigger. For example the absence of a signal from a reader in a display unit may indicate that the RF communication device has been moved away from the display unit, and therefore be used as a trigger to start operation of the enhanced power mode.

Figure 11:
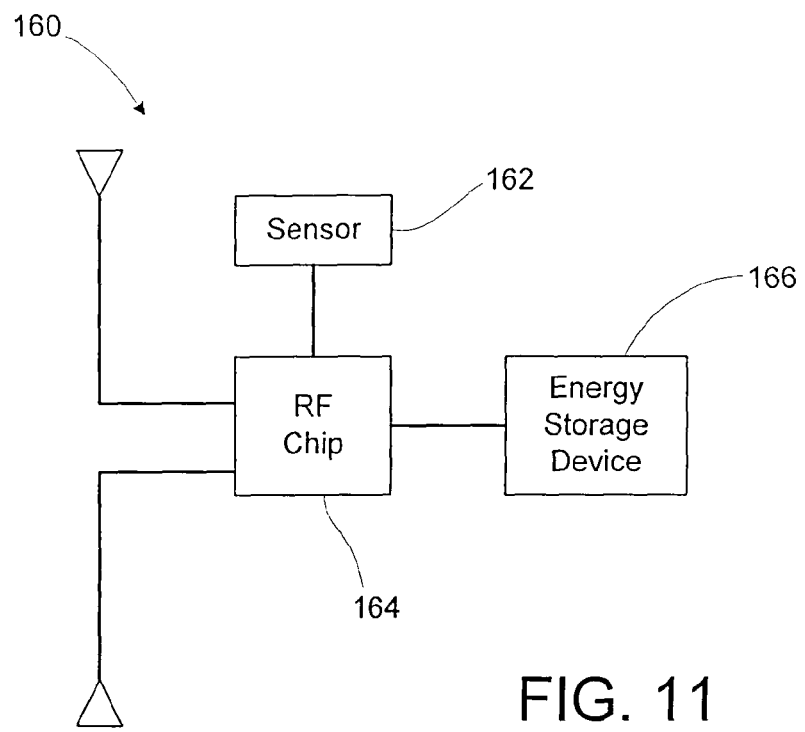
FIG. 11 is a schematic diagram of an RF communication device of a still further embodiment of the present invention.

FIG. 11 shows another possibility, an RF communication device 160 with a sensor 162 coupled to an RF chip 164 for use as a trigger for utilizing enhanced power from an energy storage device 166. The sensor 162 may be a separate device than the RF chip 164, or may be integrated as part of the RF chip 164. The sensor 162 may be a temperature sensor, a chemical sensor, a pressure sensor, a light sensor, or a sensor for some other substance or environment condition. Further information regarding incorporating sensors in RF communication devices may be found in co-owned U.S. application Ser. No. 12/013,520, filed Jan. 14, 2008, the description and drawings of which are hereby incorporated by reference.

Figure 12:
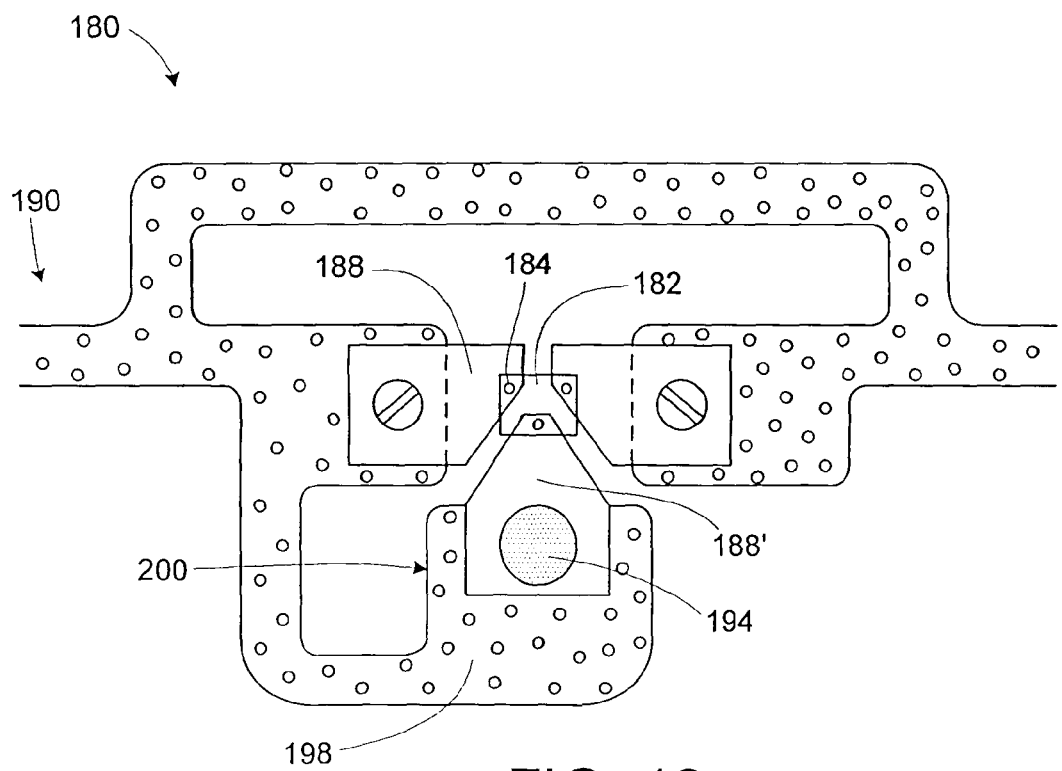
FIG. 12 is a diagram of part of an RF communication device of another embodiment of the present invention.

FIG. 12 shows an RF communication device 180 that includes an RF chip 182 that has contacts 184 that are coupled to respective conductive interposer leads 188. The leads 188 are electrically coupled to a patterned conductive material 190 that includes an antenna, most of which is not shown in the figure. An electrolyte layer 194 is between one of the interposer leads 188' and a corresponding part 198 of the conductive material 190. The interposer lead 188' and the conductive material part 198 act as electrodes, forming a battery 200 in conjunction with the electrolyte layer 194. This battery 200 may be charged using any received through the antenna, and energy stored in it may be used for enhanced power operation of the RF communication device 180.

To give example values, the battery 200 may have a capacity of about 50 μA/hr. The battery 200 may have an area of 5 mm$^2$. The battery may use a primary (non rechargeable) chemistry or rechargeable chemistry. In the case of a rechargeable chemistry, the battery may be charged using energy rectified by the RFID device.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of operating a radio frequency (RF) communication device, the method comprising:
   providing a RF communication device on a label or tag;
   placing the RF communication device on a product and placing the product on a shelf or display;
   storing energy received by the RF communication device from the shelf or display in an energy storage device of the RF communication device through a second antenna; and
   upon occurrence of a predetermined event, after removal from the shelf or display using the energy stored in the energy storage device to temporarily enhance communication by the RF communication device through a first antenna of the RF communication device.

2. The method of claim 1, wherein the using includes providing pulsed energy to a chip of the RF communication device.

3. The method of claim 2, wherein the providing pulsed energy only occurs after the energy stored in the energy storage device passes below a predetermined threshold.

4. The method of claim 2, wherein the providing includes providing the energy for 1% or less of a period of each cycle.

5. The method of claim 1, wherein at least part of the energy storage device is part of an interposer that includes the chip.

6. The method of claim 1, wherein the predetermined event includes the RF communication device reaching a predetermined temperature.

7. The method of claim 1, wherein the predetermined event is an environmental condition in the vicinity of the RF communication device.

8. The method of claim 7, further comprising detecting the environmental condition using a sensor of the RF chip and the sensor is connected to a sensing material including a flexible polymer to change a parameter when the RF communication device is on the shelf or display.

9. The method of claim 1, wherein the predetermined event includes receipt of a predetermined signal by the RF communication device.

10. The method of claim 1, wherein the enhancing communication includes improving functionality of the RF communication device as an electronic article surveillance (EAS) device.

11. The method of claim 1, wherein the energy storage device is part of chip.

12. The method of claim 1, wherein the energy storage device includes a capacitor.

13. The method of claim 1, wherein the energy storage device includes a battery.

14. A radio frequency (RF) communication device comprising:
  an RF chip as part of a tag or label;
  a first antenna coupled to the RF chip for communicating information between the RF communication device and an external reader/detector device provided on a shelf or display;
  an energy storage device coupled to the RF chip for temporarily providing enhanced power to the RF chip during communication upon occurrence of a predetermined event;
  a sensing material including a flexible polymer; and
  a second antenna coupled to the energy storage device, for providing power to the energy storage device.

15. The RF communication device of claim 14, wherein the energy storage device is a battery.

16. The RF communication device of claim 14, wherein the energy storage device is a capacitor.

17. The RF communication device of claim 14, further comprising:
  a first rectifier coupled to the first antenna; and
  a second rectifier coupled to the second antenna.

18. A radio frequency (RF) communication device comprising:
  an interposer that includes:
  an RF chip; and
  conductive pads electrically coupled to contacts on the RF chip the conductive pads are connected to a flexible polymer;
  an antenna electrically coupled to the conductive pads distinct from pads connected to the flexible polymer; and
  a battery that includes:
    an electrolyte layer; and
    parts of first and second antennas and one of conductive pads on opposite respective sides of the electrolyte layer, wherein the parts of the first and second antennas and the one of the conductive pads serve as electrodes for the battery.

* * * * *